(12) United States Patent
Innis

(10) Patent No.: US 8,970,402 B1
(45) Date of Patent: Mar. 3, 2015

(54) SYSTEM, DEVICE, AND METHOD FOR VARYING THE VISIBILITY OF SYMBOLS DEPICTED IN A VERTICAL SITUATION DISPLAY

(75) Inventor: John D. Innis, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 374 days.

(21) Appl. No.: 13/403,192

(22) Filed: Feb. 23, 2012

(51) Int. Cl.
*G01C 21/00* (2006.01)

(52) U.S. Cl.
USPC ............................ 340/977; 340/955; 340/945

(58) Field of Classification Search
USPC ......... 340/977, 945, 961, 963, 970–975, 979, 340/995
See application file for complete search history.

(56) References Cited

U.S. PATENT DOCUMENTS

| | | | |
|---|---|---|---|
| 6,088,654 A * | 7/2000 | Lepere et al. | 701/301 |
| 6,112,141 A * | 8/2000 | Briffe et al. | 701/14 |
| 6,505,102 B2 * | 1/2003 | Morizet et al. | 701/3 |
| 6,720,891 B2 | 4/2004 | Chen et al. | |
| 6,995,690 B1 * | 2/2006 | Chen et al. | 340/974 |
| 8,099,201 B1 | 1/2012 | Barber et al. | |
| 2010/0073359 A1 * | 3/2010 | Suddreth et al. | 345/419 |

* cited by examiner

*Primary Examiner* — Daniel Previl
(74) *Attorney, Agent, or Firm* — Angel N. Gerdzhikov; Donna P. Suchy; Daniel M. Barbieri

(57) ABSTRACT

Present novel and non-trivial system, device, and method for varying the visibility of symbols depicted in a vertical situation display ("VSD"). An image generator receives zone data and defines a plurality of zones, where the zone data is comprised of second image data representative of a non-VSD zone symbol(s) or feature data representative of a zone feature(s). First image data representative of a VSD is generated, where the VSD is comprised of at least one VSD symbol representative of a zone symbol or a zone feature located in one of the three zones. If the represented zone symbol or zone feature of a VSD symbol is located within a left zone or a right zone, the visibility of each VSD symbol is variable and dependent of its proximity to a center zone.

21 Claims, 7 Drawing Sheets

SYSTEM, DEVICE, AND METHOD FOR VARYING THE VISIBILITY OF SYMBOLS DEPICTED IN A VERTICAL SITUATION DISPLAY

BACKGROUND OF THE INVENTION

1. Field of the Invention

This invention pertains generally to the field of aircraft display units that present information to the pilot of an aircraft.

2. Description the Related Art

A visual situation display ("VSD") or a vertical profile display is known to those skilled in the art to provide a side view or profile of the vertical flight path of an aircraft. Along with the vertical flight path, features such as waypoints, airports, runways, and/or terrain are presented within a grid measured by vertical and horizontal scales. The vertical scale may provide altitude information of the flight path, and the horizontal scale may provide distance or time information. A horizontal scale providing distance information has been disclosed by Chen et al in U.S. Pat. No. 6,995,690 entitled "Vertical Situation Display Terrain/Waypoint Swath, Range to Target Speed, and Blended Airplane Reference," and a horizontal scale providing time information has been disclosed by Barber et al in U.S. Pat. No. 8,099,201 entitled "Vertical Profile Display with Enhanced Temporal Depiction of Navigation Information." As disclosed by both Chen and Barber, the information provided in the VSD is typically limited to a swath of area corresponding to the flight path. Features such as waypoints and terrain located within the swath are included in the VSD, and those located outside of the swath are not.

When a feature leaves the area of the swath, the VSD symbol representing the feature may suddenly disappear from the VSD as it crosses a boundary of the swath; similarly, when a feature moves into the area of the swath, the feature may suddenly appear on the VSD. Because the edges of the swath may depend upon the location of the flight path, momentary diversions of the aircraft from the flight path could cause the VSD symbol to flicker (i.e., suddenly appear and disappear or vice versa) as the feature momentarily enters or leaves the swath. Because this flickering may be a source of a nuisance and annoying to the pilot, an unwanted distraction may arise which diminishes a pilot's situational awareness and/or concentration as he or she accomplishes other tasks related to flying the aircraft.

BRIEF SUMMARY OF THE INVENTION

The embodiments disclosed herein present at least one novel and non-trivial system, device, and method for varying the visibility of symbols depicted in a VSD. By varying the visibility of symbols depicted in a VSD, the flickering of VSD symbols may be eliminated and safety of flight may be improved.

In one embodiment, a system for varying the visibility of symbols depicted in a VSD is disclosed. The system may be comprised of a source of zone data and an image generator ("IG") configured to perform the method disclosed below for generating image data. The system may further include a feature data source from which feature data may be received and/or an indicating system configured to receive the image data provided by the IG, from which variable-visibility VSD symbols are depicted in the VSD that is presented on a display unit.

In another embodiment, a device for varying the visibility of symbols depicted in a VSD is disclosed. The device may be the IG configured to perform the method disclosed in the following paragraph. The device could include input and output interfaces to facilitate the receiving of the zone data and the providing of the image data to the indicating system. The IG and the input and output interfaces could be part of a module such as a printed circuit board.

In another embodiment, a method for varying the visibility of symbols depicted in a VSD is disclosed, where the method could be performed by the IG. When properly configured, the CG may receive zone data, define three zones from the zone data, and generate first image data representative of a vertical situation display comprised of at least one non-flickering, VSD symbol.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
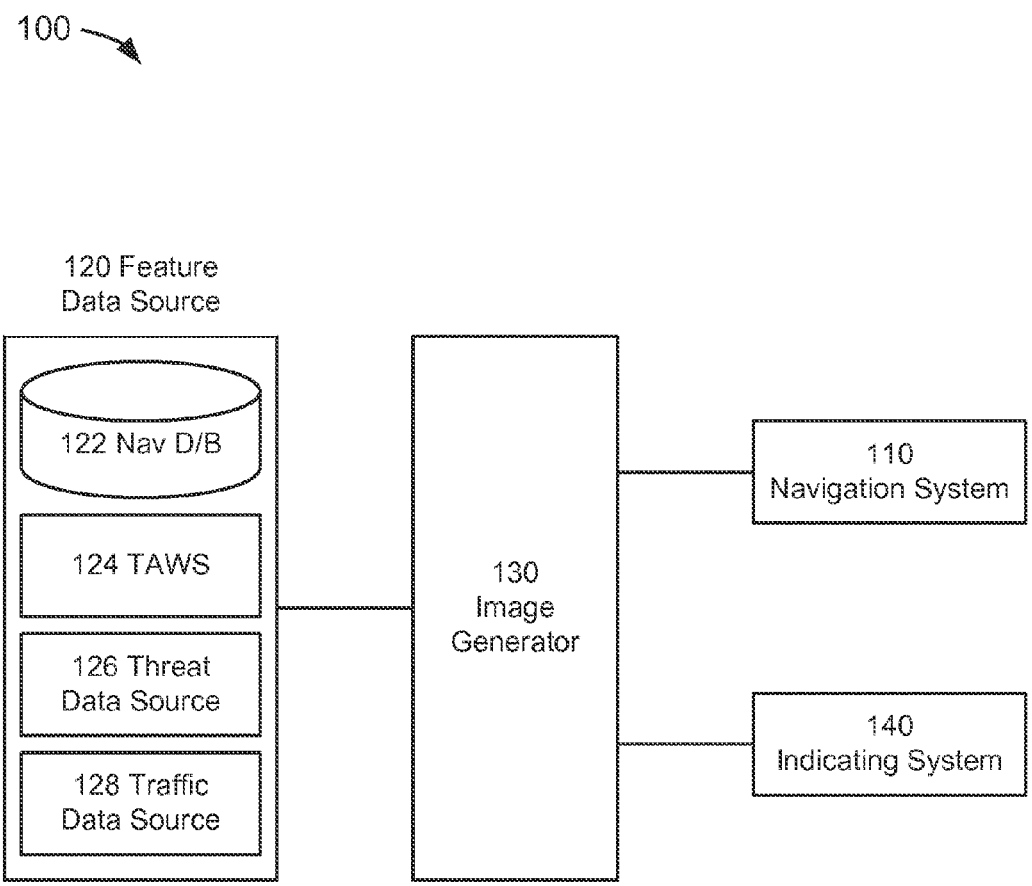
FIG. 1 depicts a block diagram of a symbology visibility varying system.

FIG. 1 depicts a block diagram of a symbology visibility varying system 100 suitable for implementation of the techniques described herein. The waypoint visibility varying system 100 of an embodiment of FIG. 1 includes a navigation data source 110, a waypoint database 120, an image generator ("IG") 130, and an indicating system 140.

In an embodiment of FIG. 1, the navigation data source could be comprised of any source(s) configured to provide data representative of aircraft information, where such information could be comprised of, but not limited to, heading, ground track, wind correction angle information, horizontal position, vertical position, pressure altitude, horizontal velocity (e.g., ground speed), vertical velocity, horizontal position accuracy, vertical position accuracy, horizontal velocity accuracy, vertical velocity accuracy, and/or aircraft intended flight path information. It should be noted that data, as embodied herein for any source or system in an aircraft including the navigation data source 110, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation data source 110 may include, but is not limited to, an air/data system, an attitude heading reference system, an inertial guidance system (or inertial reference system), a global navigation satellite system ("GNSS") (or global positioning system ("GPS") or satellite navigation system), and/or a flight management system ("FMS") (which is comprised of, in part, a navigation database 122), all of which are known to those skilled in the art. As embodied herein, the navigation data source 110 may provide navigation data to the IG 130 for subsequent processing as discussed herein.

In an embodiment of FIG. 1, the feature data source 120 could be any source configured to provide feature information. One feature data source 120 could be comprised of a navigation database 122 which stores or contains data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, and/or GNSS Landing Systems. Such navigation database 122 could be provided by an aircraft system such as, but not limited to, the FMS discussed above.

The feature data source 120 is not exclusively a single system but could be comprised of other system(s) known to those skilled in the art from which information corresponding to external conditions (i.e., conditions outside of the aircraft) may be presented by the indicating system 140. Another feature data source 120 could be comprised of a Terrain Awareness and Warning System ("TAWS") 124 or any other source(s) configured to provide data representative of terrain and/or obstacle information.

Another feature data source 120 could be comprised of a threat data source 126 could be any source that may provide data representative of hazardous flight conditions. One threat source could be an aircraft defense system ("ADS") installed in an aircraft for providing threat information of hostile military weaponry to the pilot. Another threat source could be a weather system installed in an aircraft for providing threat or hazardous information related to meteorological conditions to the pilot.

Another feature data source 120 could be a traffic data source 128 comprised of any source(s) configured to provide data representative of traffic information such as other aircraft and/or surface vehicles. The traffic data source 128 for other aircraft could be comprised of one or more systems such as, but not limited to, a traffic collision avoidance system ("TCAS"), an automatic dependent surveillance-broadcast ("ADS-B") system, an aircraft datalink system, an on-board airborne radar system, an on-board optical aircraft sensor system, a traffic information service-broadcast ("TIS-B") system, and/or an automatic dependent surveillance-rebroadcast ("ADS-R") system.

In an embodiment of FIG. 1, the IG 130 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG 130 may be driven by the execution of software or computer instruction code containing algorithms developed for the specific functions embodied herein. The IG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the IG 130 could be a processor(s) used by or in conjunction with any other system of the aircraft including, but not limited to, the navigation data source 110, the feature data source 120, and the indicating system 140, or any combination thereof.

The IG 130 may be programmed or configured to receive as input data representative of information obtained from various systems and/or sources including, but not limited to, the navigation data source 110 and/or the feature data source 120. As embodied herein, the terms "programmed" and "configured" are synonymous. The IG 130 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a wired data bus or through a wireless network. The IG 130 may be programmed or configured to execute one or both of the methods discussed in detail below and provide output data to various systems and/or units including, but not limited to, the indicating system 140.

In an embodiment of FIG. 1, the indicating system 140 could be comprised of any display unit having a display surface on which symbology may be presented to the pilot on a display surface of the display unit. The display unit could be, but is not limited to, a Primary Flight Display ("PFD"), Navigation Display ("ND"), Head-Up Display ("HUD"), Head-Down Display ("HDD"), Multi-Purpose Control Display Unit, Engine Indicating and Crew Alerting System, Electronic Centralized Aircraft Monitor, Multi-Function Display, Side Displays, and Data Link Control Display Unit.

The display unit could be configured to present tactical display(s) and/or a strategic display(s). The tactical display could be comprised of any image presented on a display unit which presents tactical information to the crew relative to the instant or immediate control of the aircraft, whether the aircraft is in flight or on the ground. The tactical display unit could be presented on the HDD and/or the HUD. The HOD is typically a unit mounted to an aircraft's flight instrument panel located in front of a pilot and below the windshield and the pilot's field of vision. The HUD is mounted in front of the pilot at windshield level and is directly in the pilot's field of vision. The HUD is advantageous because the display is transparent allowing the pilot to keep his or her eyes "outside the cockpit" while the display unit provides tactical flight information to the pilot The tactical display could present the same information found on a PFD, such as "basic T" information (i.e., airspeed, attitude, altitude, and heading). Although it may provide the same information as that of a PFD, the tactical display may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display is designed to provide flexible configurations which may be tailored to the desired configuration specified by a buyer or user of the aircraft. One example of such the tactical display is the PFD.

The strategic display could be comprised of any image which presents strategic information to the crew relative to the intended future state(s) of the aircraft (e.g. intended location in space at specified times) along with information providing contextual and/or feature information to the crew (e.g. navigation aids, airspace boundaries, terrain, threats, traffic, geopolitical boundaries, etc. . . . ) about such state(s). One example of such the strategic display is the ND.

Figure 2A:
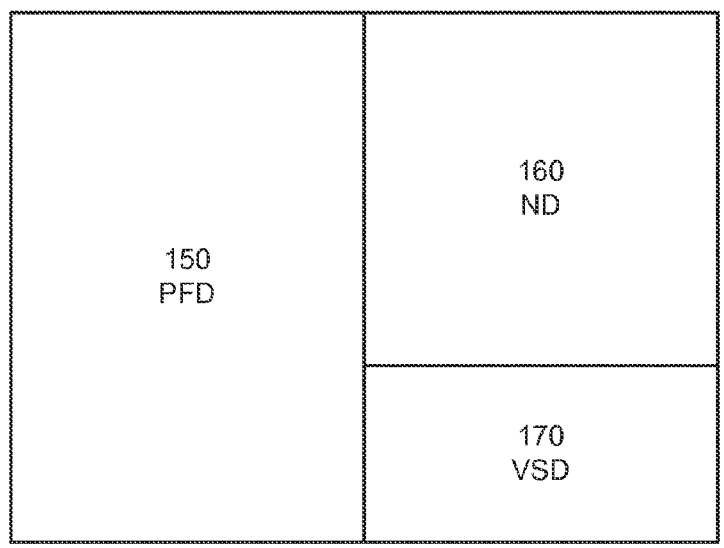
FIG. 2A depicts a display unit configured to display three images simultaneously.

The display unit may be configured to present one or more display(s) or image(s); as embodied herein, the terms "display" and "image" are interchangeable and treated synonymously. Referring to FIG. 2A, a display unit has been configured to present three images of displays on the screen of the display unit: the tactical display comprised of a PFD 150, the strategic display comprised of an ND 160, and a the strategic display comprised of a vertical situation display ("VSD") 170.

Figure 2B:
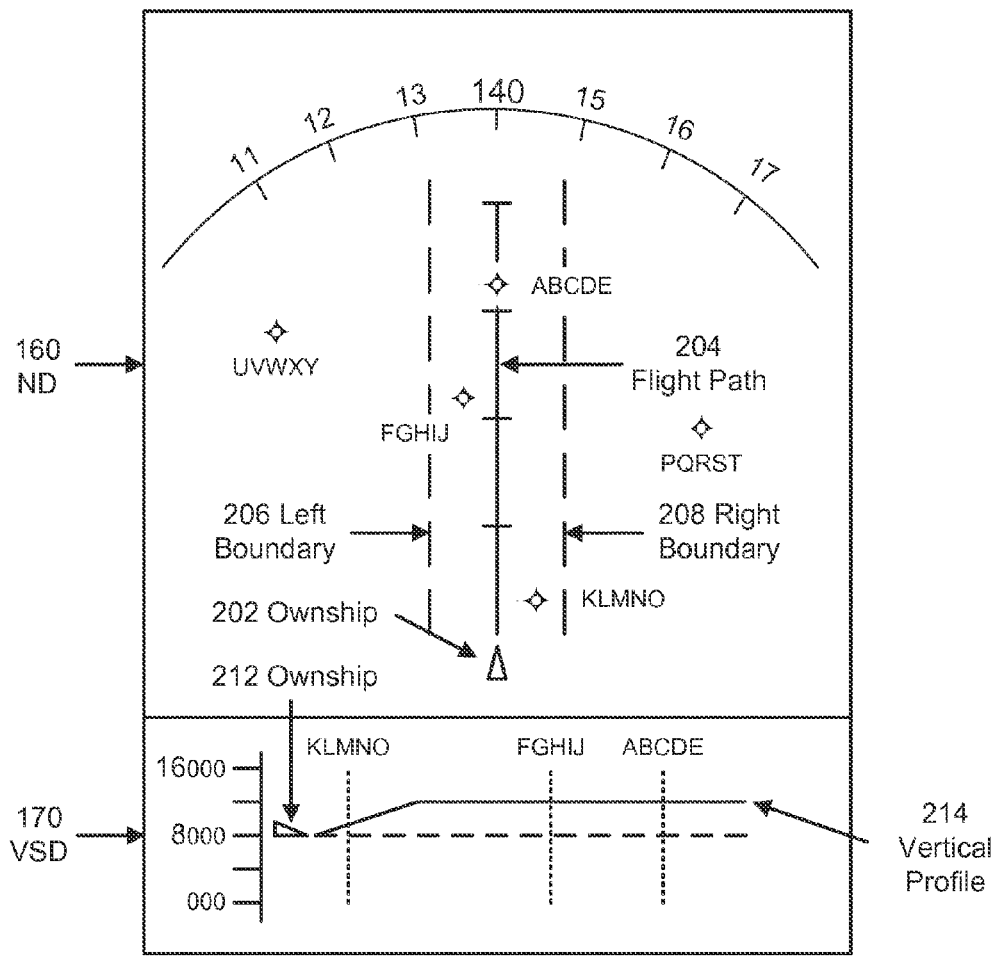
FIG. 2B depicts exemplary illustrations of symbologies displayed by both a navigation display and a VSD.

Referring to FIG. 2B, exemplary illustrations of symbologies are depicted by the ND 160 and the VSD 170 that could be presented on the screen of the display unit shown in FIG. 2A. The symbols depicted by the ND 160 include ownship 202, its flight path 204, a left boundary 206, a right boundary 208, and five features represented by waypoints for the sole purpose of discussion and not limitation: ABCDE, FGHIJ, KLMNO, PQRST, and UVWXY; in the configuration shown, the right boundary 206 and the left boundary 208 are assumed equidistant from the flight path 204. The symbols depicted by the VSD 170 include ownship 212, a vertical profile of its flight path 214, and the three features ABCDE, FGHIJ, and KLMNO. A vertical axis representative of altitude scale is shown on the left side of the VSD 170, a horizontal axis that could be representative of either a distance scale and/or a time scale is shown in the center, and features ABCDE, FGHIJ, and KLMNO shown at their respective distances and/or times from ownship 212. It should be noted that the symbology shown in FIG. 2B has been made minimal intentionally for the sake of presentation and is not indicative of the plurality of indications or information with which it may be configured.

Features ABODE, FGHIJ, and KLMNO appear as VSD symbols in the VSD 170 because they are located within the center zone formed in between the left boundary 206 and the right boundary 208; features PQRST and UVVVXY do not because they fall outside of the center zone. As embodied herein, the locations of the left boundary 206 and the right boundary 208 may be configurable by a manufacturer and/or end-user and may be based upon screen locations or geographical locations. For example, the locations of the left boundary 206 and the right boundary 208 may be configured as a fixed pixel distance from the pixel(s) of the flight path symbol and/or fixed pixel columns where, for instance, the flight path symbol is displayed vertically. In another example, the locations of the left boundary 206 and the right boundary 208 could be variable and dependent upon the range selection of the display unit and/or the ND 160. If variable and range selection is known, the locations of the left boundary 206 and the right boundary 208 could be configured to coincide with required navigation performance ("RNP") standard(s) for the flight path or another standard that may be developed by a manufacturer and/or end-user.

Besides boundaries configured using screen locations, the locations of the left boundary 206 and the right boundary 208 could depend of geographical locations determined from the geographic locations of the flight path. The boundaries could be located a fixed distance from the flight path or variable and dependent upon an ascertainable standard such at the RNP standard(s) or another standard developed by a manufacturer and/or end-user. Once geographical locations of the left boundary 206 and the right boundary 208 have been determined, feature data representative of each feature located within the center zone may be retrieved or received from the feature data source 120 by the IG 130. Then, image data representative of both boundaries, the center zone features, and/or flight path may be generated and presented by the ND 160 by techniques known to those skilled in the art.

When a feature or feature symbol depicted by the ND 160 transitions out of the center zone, the symbol may suddenly disappear from the VSD 170 as it crosses a boundary; similarly, when it transitions into the center zone, the symbol may suddenly appear on the VSD 170 as it crosses a boundary. Occasionally, a feature or a feature symbol may be located on or near a boundary. Because the locations of the boundaries may depend upon the location of the flight path or symbol thereof, momentary diversions of ownship from the flight path could cause the VSD symbol of the feature to flicker (i.e., suddenly appear and disappear or vice versa) as the feature or a feature symbol momentarily transitions into or out of the center zone.

Figure 3A:
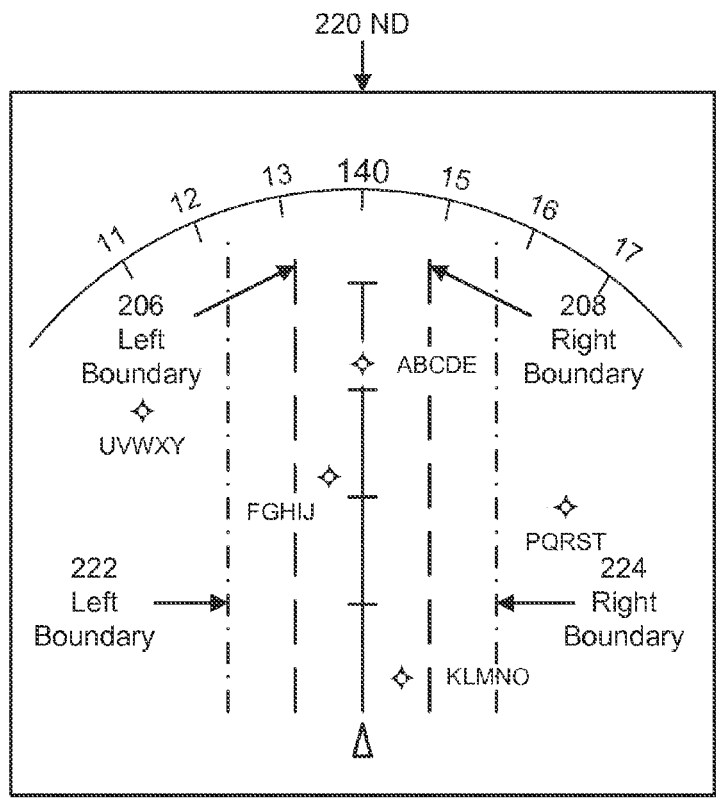
FIG. 3A depicts the symbologies displayed by a navigation display and a VSD of FIG. 2A and two boundaries creating left and right zones.
Figure 3A:
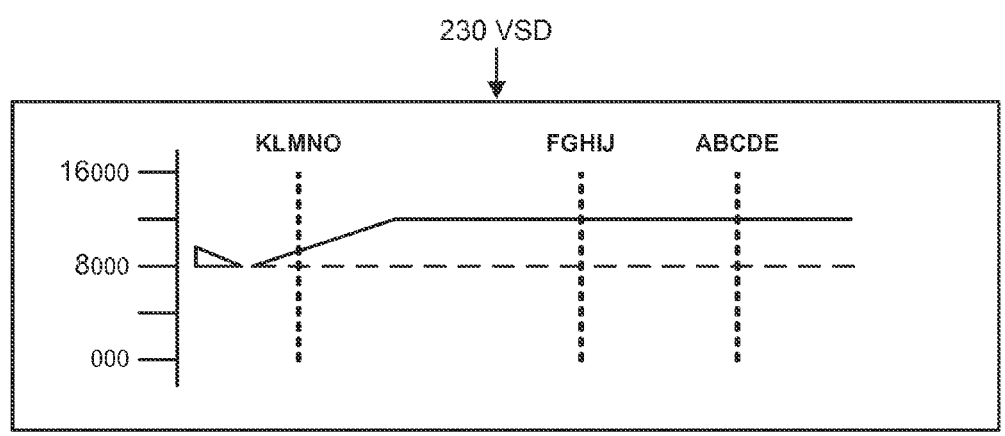

The advantages and benefits of the embodiments discussed herein may be disclosed in the drawings of FIGS. 3A through 3D by illustrating how symbol(s) depicted by the VSD 170 may avoid flickering through the use of a visibility transitioning zone(s). Referring to FIG. 3A, the symbologies depicted by the ND 160 and the VSD 170 of FIG. 2B and discussed above are shown by ND 220 and VSD 230, respectively. Symbols of features ABCDE, FGHIJ, and KLMNO depicted by the VSD 230 have been made visually bolder to make them conspicuous for the purpose of discussing the embodiments disclosed herein. In addition to the symbologies, a left boundary 222 and a right boundary 224 have been included on the ND 220 to illustrate the embodiments disclosed herein although they may not be generated as symbology seen by the pilot. The left boundary 222 and the right boundary 224 may be used to establish or define zones: a left zone located in between the left boundaries 206 and 222 and a right zone located in between the right boundaries 208 and 224. Similar to the left boundary 206 and the right boundary 208, the locations of the left boundary 222 and the right boundary 224 may be configurable by a manufacturer and/or end-user and may be based upon screen locations or geographical locations as discussed above. Moreover, even though symbology of the left and the right boundaries 222 and 224 may not be generated, screen locations may nevertheless be used to define the left and right zones, respectively.

It should be noted that the left boundaries 206 and 222 and the right boundaries 208 and 224 shown in the drawings of FIGS. 3A through 3D are not drawn to scale but placed to emphasize the differences. For example, the left boundary 206 and the right boundary 208 could correspond to a distance of 5 nautical miles ("NM") from the flight path each, whereas the left boundary 222 and the right boundary 224 could correspond to a distance of 0.25 NM from the left boundary 206 and the right boundary 208, respectively.

As shown in FIG. 3A, VSD symbols ABODE, FGHIJ, and KLMNO representative of features or symbols of features ABODE, FGHIJ, and KLMNO, respectively, are depicted by the VSD 230 using a visibility configuration that has been predetermined for zone features or zone symbols located in the center zone; as embodied herein, zone features or zone symbols may be those features or symbols of features, respectively, located in either the left zone, center zone, or right zone. As observed in FIG. 3A, there are no VSD symbols PQRST and UVWXY representative of feature or feature symbols PQRST and UVWXY, respectively, for they are neither zone features nor zone symbols.

Figure 3B:
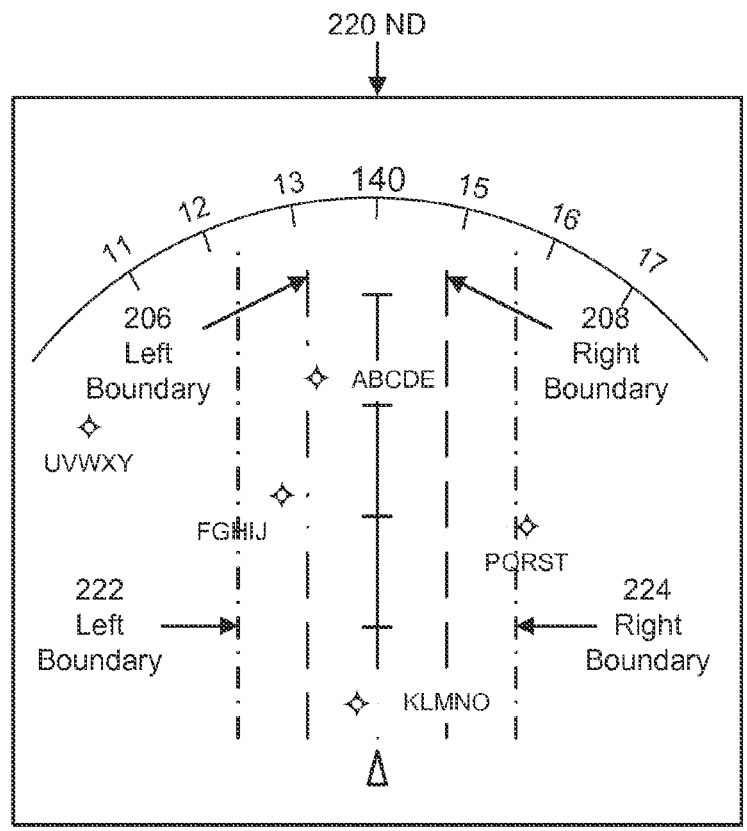
FIG. 3B depicts the symbologies displayed in FIG. 3A but with different locations with respect to the left and right zones.
Figure 3B:
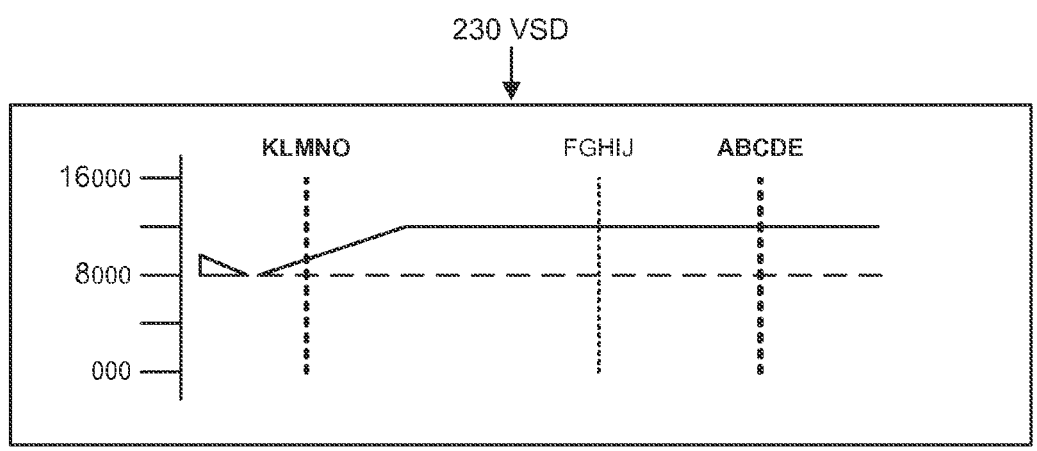

Referring to the ND 220 of FIG. 3B and comparing it to the ND 220 of FIG. 3A, the flight path of FIG. 3B is right of the flight path of FIG. 3A. Zone feature or zone symbol FGHIJ has crossed the left boundary 206 and has moved from the center zone into the left zone. As shown in the VSD 230 of FIG. 3B and compared with the visibilities of VSD symbols ABCDE and KLMNO, the visibility of VSD symbol FGHIJ has decreased. For the purpose of illustration and not limitation, it will be assumed that the manufacturer and/or end-user has configured the visibility of each VSD symbol to vary, where the variability is based upon the proximity of the represented zone feature or zone symbol to the center zone.

Figure 3C:
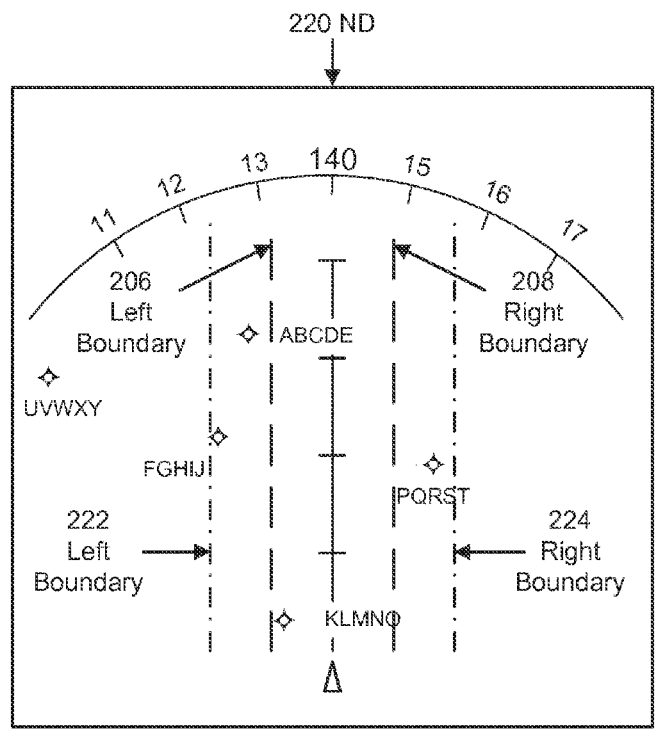
FIG. 3C depicts the symbologies displayed in FIG. 3B but with different locations with respect to the left and right zones.
Figure 3C:
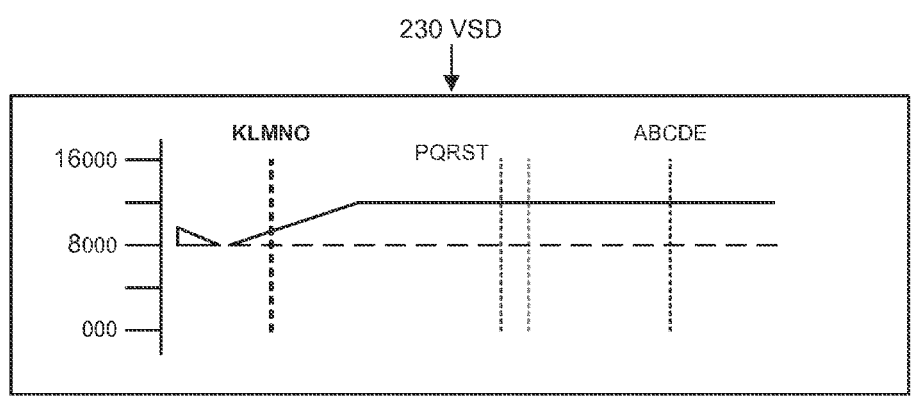

Referring to the ND 220 of FIG. 3C and comparing it to the ND 220 of FIG. 3B, the flight path of FIG. 3C is right of the flight path of FIG. 3B. Zone feature or zone symbol FGHIJ is still in the left zone but very close to the left boundary 222; when compared with the VSD symbol FGHIJ of FIG. 3B, the visibility of VSD symbol FGHIJ has decreased even further to a point where it is almost no longer visible. Also, zone feature or zone symbol ABCDE of FIG. 3C has crossed the left boundary 206 and has moved from the center zone into the left zone; when compared with the VSD symbol ABCDE of FIG. 3B, the visibility of VSD symbol ABCDE has decreased but it is more visible than the VSD symbol FGHIJ of FIG. 3C because its represented zone feature or zone symbol is closer to the center zone. In addition, feature or symbol PQRST has crossed the right boundary 224 to become a zone feature or zone symbol, respectively, and has moved into the right zone. Because of its proximity to the center zone and comparing it with the proximities of the zone features or zone symbols FGHIJ and ABODE of FIG. 3C to the center zone, the visibility of VSD symbol PQRST is greater than VSD symbol FGHIJ but less than VSD symbol ABODE.

Figure 3D:
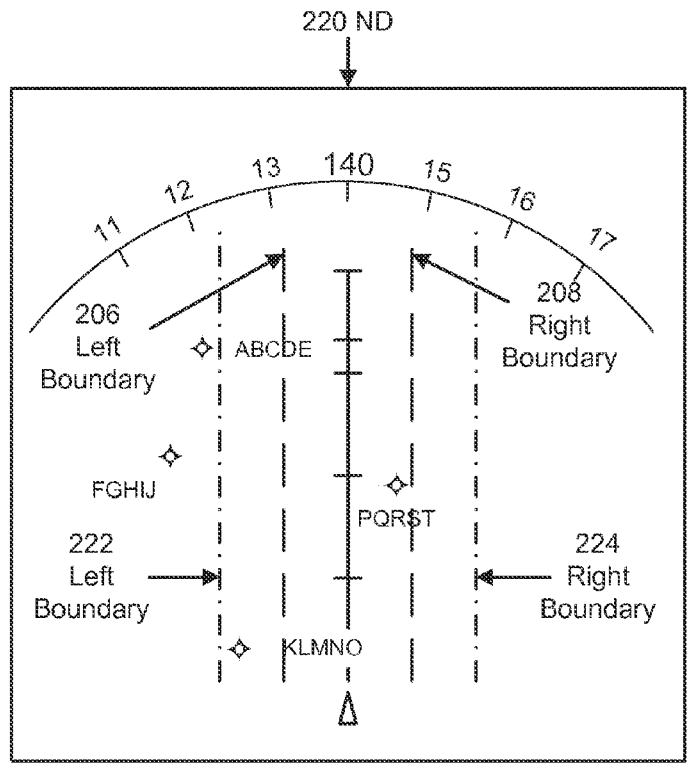
FIG. 3D depicts the symbologies displayed in FIG. 3C but with different locations with respect to the left and right zones.
Figure 3D:
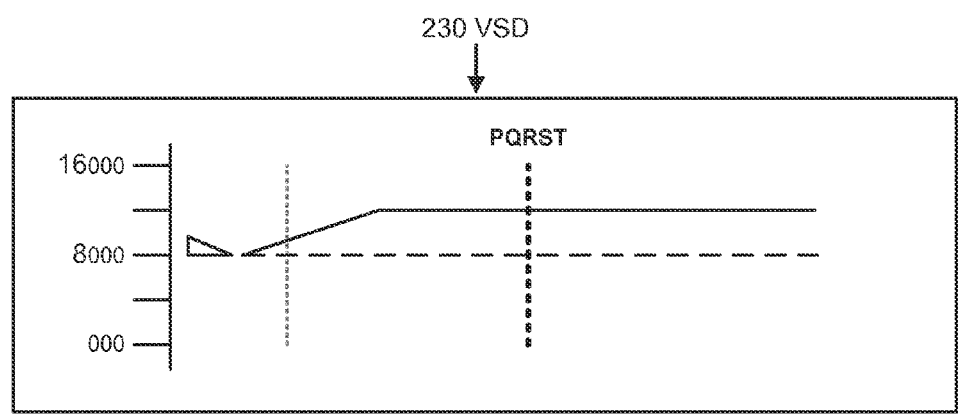

Referring to the ND 220 of FIG. 3D and comparing it to the ND 220 of FIG. 3C, the flight path of FIG. 3D is right of the flight path of FIG. 3C. Zone features or zone symbols FGHIJ and ABCDE are no longer located within one of the three zones and are no longer considered zone features or zone symbols; thus, they do not appear on the VSD 230 of FIG. 3D. Zone feature or zone symbol KLMNO is still in the left zone but close to the left boundary 222; when compared with the VSD symbol KLMNO of FIG. 3C, the visibility of VSD symbol KLMNO has decreased. Also, zone feature or zone symbol PQRST has crossed the right boundary 208 has moved from the right zone into the center zone, where its visibility may be determined using the predetermined visibility configuration for zone features or zone symbols located in the center zone.

Figure 4:
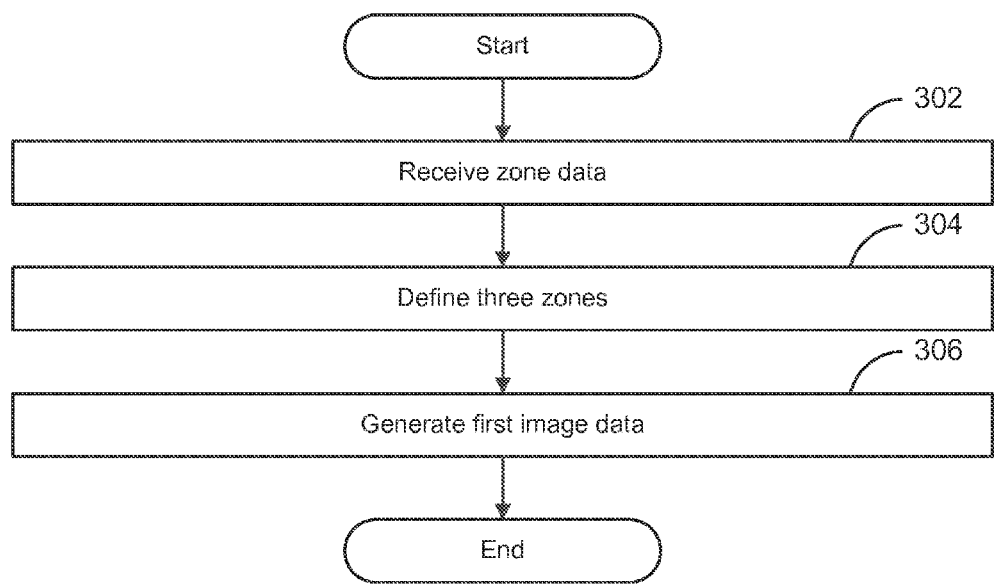
FIG. 4 depicts a flowchart of a method for varying the visibility of symbols depicted in a VSD.

FIG. 4 depicts flowchart 300 providing examples for varying the visibility of symbols depicted in a VSD, where the IG 130 may be programmed or configured with instructions corresponding to the following modules. As embodied herein, the IG 130 may be a processor of a module such as, but not limited to, a printed circuit card having one or more input interfaces to facilitate data communications with the IG 130, i.e., the receiving and providing of data. As necessary for the accomplishment of the following modules embodied in FIG. 4, the receiving of data is synonymous and/or interchangeable with the retrieval of data, and the providing of data is synonymous and/or interchangeable with the making available, supplying, and/or sending of data.

The method of flowchart 300 begins with module 302 with the receiving of zone data corresponding to a flight path. As embodied herein, the zone data may be received from one or more sources such as, but not limited to, the IG 130, another IG, the indicating system 140, and another indicating system. The indicating system could be comprised of the IC 130 or a different IC.

The zone data could take a plurality of forms. In one embodiment, the zone data could be image data representative of a non-vertical situation display ('non-VSD") comprised of the flight path and one or more zone symbols, where the image data may be representative of a screen location(s) of the flight path and each zone symbol. In another embodiment, the zone data could be navigation data representative of the flight path and one or more zone features.

The flowchart continues with module 304 with the defining of three zones from the zone data; the three zones may be comprised of a center zone, a left zone located to the left of the center zone, and a right zone located to the right of the center zone. If the zone data is image data representative of a non-VSD, screen locations may be used to define the boundaries of each of the three zones. In addition, data representative of a range selection may be provided and included if a manufacturer and/or end-user desires a configuration which varies screen locations for different range selections. If the zone data is navigation data, geographic locations may be used to define the boundaries of each of the three zones.

The flowchart continues with module 306 with the generating of image data representative of a VSD; the VSD may be comprised of a horizontal axis, a vertical axis, a vertical profile corresponding to the flight path, and one VSD symbol representative of each zone symbol or zone feature located in one of the three zones. If the zone data is image data representative of a non-VSD, then the visibility of each VSD symbol may be variable (e.g., increase or decreases) if the represented zone symbol is located within the left zone or the right zone, where the variability of the visibility may be dependent upon the proximity of the represented zone symbol to the center zone. If the zone data is navigation data, then the visibility of each VSD symbol may be variable if the represented zone feature is located within the left zone or the right zone, where the variability of the visibility may be dependent upon the proximity of the represented zone symbol to the center zone.

In an additional embodiment, the image data representative of a VSD may be provided to the indicating system 140 configured to receive this image data. Once received, the VSD could be presented on the display unit. For each zone symbol or zone feature moving toward the center zone, the visibility of VSD symbol representative of it may increase (i.e., fade in); for each zone symbol or zone feature moving away from the center zone, the visibility of VSD symbol representative of it may decrease (i.e., fade out). In addition, the image data representative of a non-VSD may be provided to the indicating system 140 configured to receive this image data. Once received, both the VSD and non-VSD could be presented on the display unit at the same time. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for varying symbology visibility of symbols depicted in a vertical situation display, said system comprising:
    a source of zone data; and
    a first image generator configured to
        receive zone data corresponding to a flight path,
        define three zones from the zone data, where the three zones are comprised of
            a center zone,
            a left zone located to the left of the center zone, and
            a right zone located to the right of the center zone, and
        generate first image data representative of a vertical situation display comprised of a vertical profile corresponding to the flight path and at least one vertical situation display symbol representative of a zone symbol or a zone feature located in one of the three zones, where
            visibility of each vertical situation display symbol is variable if the represented zone symbol or zone feature is located within the left zone or the right zone, and
            the variability of the visibility of each vertical situation display symbol is dependent upon the proximity of the represented zone symbol or zone feature to the center zone.

2. The system of claim 1, wherein the source of the zone data is the first image generator or a second image generator.

3. The system of claim 1, wherein the source of the zone data is an indicating system.

4. The system of claim 3, wherein the indicating system is comprised of the first image generator, a second image generator, or both.

5. The system of claim 1, wherein the zone data is second image data representative of a non-vertical situation display comprised of the flight path and at least one zone symbol.

6. The system of claim 5, wherein
    the first image generator is further configured to
        receive data representative of a range selection of a display unit, and
        include the range selection while the three zones are defined.

7. The system of claim 1, further comprising:
    a source of feature data, such that
        the first image generator is further configured to
            receive feature data representative of each zone feature located within the three zones, and
        the source of zone data is a navigation system, where the zone data is navigation data representative of the flight path.

8. The system of claim 1, further comprising:
    an indicating system configured to
        receive the first image data from the first image generator, where
            the first image generator has been further configured to provide the first image data to the indicating system, and
        present the vertical situation display represented in the first image data on the screen of a display unit of the indicating system, whereby
            the visibility of each vertical situation display symbol
                increases as the represented zone symbol or zone feature moves toward the center zone, and
                decreases as the represented zone symbol or zone feature moves away from the center zone.

9. The system of claim 8, wherein
    the indicating system is further configured to
        receive the zone data if the zone data is second image data representative of a non-vertical situation display comprised of the flight path and at least one zone symbol, and
        present the non-vertical situation display represented in the second image data simultaneously on the display unit with the vertical situation display represented in the first image data.

10. A device for varying symbology visibility of symbols depicted in a vertical situation display, said device comprising:
    a first image generator configured to
        receive zone data corresponding to a flight path,
        define three zones from the zone data, where the three zones are comprised of
            a center zone,
            a left zone located to the left of the center zone, and
            a right zone located to the right of the center zone, and
        generate first image data representative of a vertical situation display comprised of a vertical profile corresponding to the flight path and at least one vertical situation display symbol representative of a zone symbol or a zone feature located in one of the three zones, where
            visibility of each vertical situation display symbol is variable if the represented zone symbol or zone feature is located within the left zone or the right zone, and
            the variability of the visibility of each vertical situation display symbol is dependent upon the proximity of the represented zone symbol or zone feature to the center zone.

11. The device of claim 10, wherein the zone data is second image data representative of a non-vertical situation display comprised of the flight path and at least one zone symbol.

12. The device of claim 11, wherein
    the first image generator is further configured to
        receive data representative of a range selection of a display unit, and
        include the range selection while the three zones are defined.

13. The device of claim 10, wherein
    the first image generator is further configured to
        receive feature data representative of each zone feature located within the three zones, and
    the zone data is navigation data representative of the flight path.

14. The device of claim 10, wherein
the first image generator is further configured to
provide the first image data to an indicating system, such that
the vertical situation display represented in the first image data is presented on the screen of a display unit of the indicating system, whereby
the visibility of each vertical situation display symbol increases as the represented zone symbol or zone feature moves toward the center zone, and decreases as the represented zone symbol or zone feature moves away from the center zone.

15. The device of claim 14, wherein a non-vertical situation display represented in second image data and comprised of the flight path and at least one zone symbol is presented simultaneously on the display unit with the vertical situation display represented in the first image data.

16. A method for varying symbology visibility of symbols depicted in a vertical situation display, said method comprising:
receiving zone data corresponding to a flight path;
defining three zones from zone data corresponding to a flight path, where the three zones are comprised of
a center zone,
a left zone located to the left of the center zone, and
a right zone located to the right of the center zone; and
generating first image data representative of a vertical situation display comprised of a vertical profile corresponding to the flight path and at least one vertical situation display symbol representative of a zone symbol or a zone feature located in one of the three zones, where
visibility of each vertical situation display symbol is variable if the represented zone symbol or zone feature is located within the left zone or the right zone, and
the variability of the visibility of each vertical situation display symbol is dependent upon the proximity of the represented zone symbol or zone feature to the center zone.

17. The method of claim 16, wherein the zone data is second image data representative of a non-vertical situation display comprised of the flight path and at least one zone symbol.

18. The method of claim 17, further comprising:
receiving data representative of a range selection of a display unit, and
including the range selection during the defining of the three zones.

19. The method of claim 16, further comprising:
retrieving feature data representative of each zone feature located within the three zones, and
the zone data is navigation data representative of the flight path.

20. The method of claim 16, further comprising:
providing the first image data to an indicating system, such that
the vertical situation display represented in the first image data is presented on the screen of a display unit of the indicating system, whereby
the visibility of each vertical situation display symbol increases as the represented zone symbol or zone feature moves toward the center zone, and decreases as the represented zone symbol or zone feature moves away from the center zone.

21. The method of claim 20, wherein a non-vertical situation display represented in second image data and comprised of the flight path and at least one zone symbol is presented simultaneously on the display unit with the vertical situation display represented in the first image data.

* * * * *